T. F. STEVENSON.
MACHINES FOR MAKING LEAD TRAPS AND BENDS.
No. 175,387 — Patented March 28, 1876.
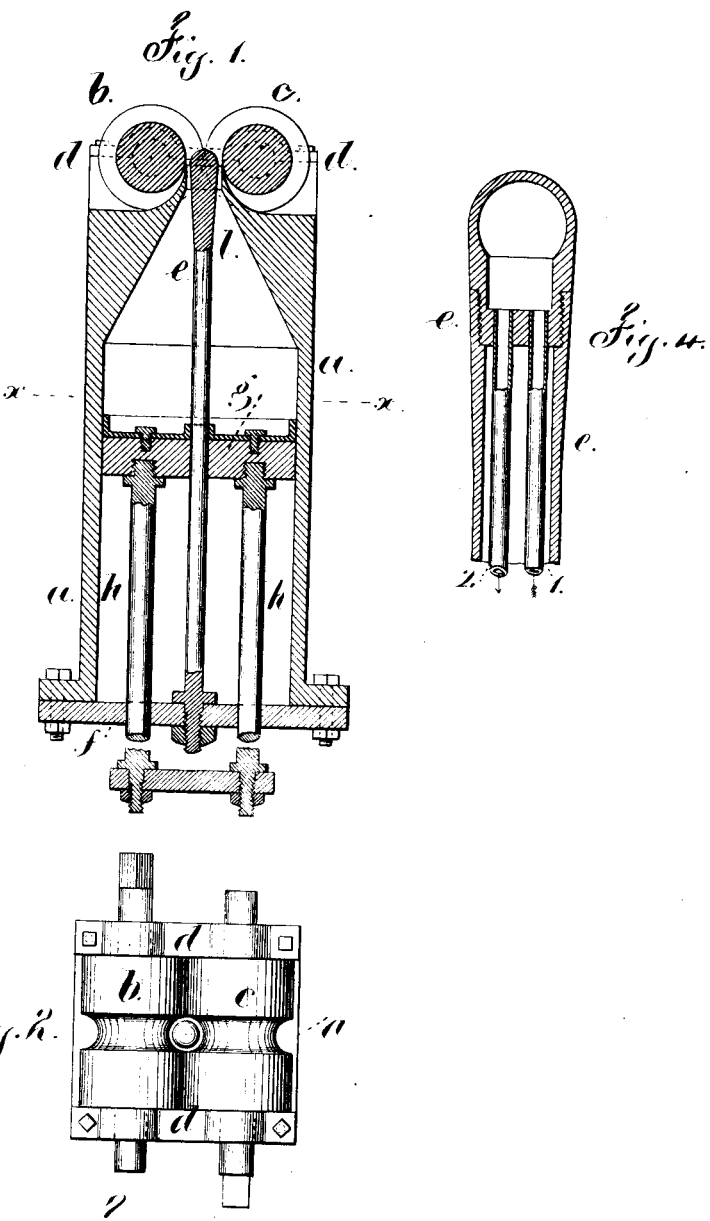
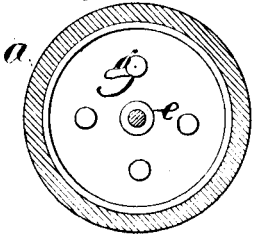

UNITED STATES PATENT OFFICE

THOMAS F. STEVENSON, OF BROOKLYN, NEW YORK.

IMPROVEMENT IN MACHINES FOR MAKING LEAD TRAPS AND BENDS.

Specification forming part of Letters Patent No. 175,387, dated March 28, 1876; application filed August 11, 1875.

*To all whom it may concern:*

Be it known that I, THOMAS F. STEVENSON, of Brooklyn, in the county of Kings and State of New York, have invented an Improvement in Means for Making Lead Traps and Bends, of which the following is a specification:

Lead traps and bends have heretofore been made by casting in a mold with a central core, and they have also been constructed by compressing and bending the pipe after it has been cast.

My improvement relates to casting the trap progressively, and bending it as cast, and at the same time consolidating the metal by rolling. I employ a fountain of melted metal that is either above or below a core, and a pair of rolling-dies. A plunger is used to press the metal up and out between the rollers when the fountain is below the same, or, if placed above, a valve is used to regulate the flow of melted metal. The rollers are revolved at equal speed, and the pipe is formed in the annular groove in the rollers and around the core, the metal being at the same time compressed. To form a bend, one roller is stopped to detain that side of the pipe, and the revolution of the other is continued to move that side of the pipe, and bend the pipe around the roller that is stopped, without flattening the pipe while the bend is being formed. To make a reverse bend, as in an S trap, the moving roller is stopped and the other set in motion, which bends the pipe in the other direction.

In the drawing, Figure 1 is a vertical section of the apparatus. Fig. 2 is a plan of the same, and Fig. 3 is a sectional plan at the line $x\ x$.

The lead-fountain is shown as a cylinder, $a$, that is below the rollers $b\ c$, said rollers being in bearings $d$ upon the cylinder-head, as shown, or the bearings may be separate from the fountain. The rollers $b\ c$ are made with semicircular grooves, so as to leave between them an annular space for the pipe. The central core $e$ is in this annular space. This core $e$ is made with a spheroidal end, and the core is a rod that passes down through the fountain and is bolted to the lower cross-bar $f$ of the cylinder $a$, so as to retain the core firmly in its place.

The core $e$ may be solid, as shown in Fig. 1, or hollow, as seen in the enlarged Fig. 4, and provided with pipes 1 and 2, through which water may be allowed to circulate to keep the core cool. The core may be supported by a cross-bridge, as in a Bramah lead-pipe press, instead of extending through the plunger.

The plunger or ram $g$ is employed to press the melted metal up and out of the die $l$, at the upper end of the fountain, around the core $e$, and between the rollers $b\ c$, to form the pipe. The plunger or ram may be provided with rods $h$, which pass through the head $f$ of the cylinder and are bolted to a cross-head, to which cross-head the connections can be made for actuating the plunger.

The plunger or ram $g$ may be provided with a packing around its periphery to prevent the melted metal passing between it and the interior surface of the fountain, and there may also be a packing around the rod that supports the core $e$ where it passes through the plunger $g$.

The rollers $b\ c$ are revolved in any desired manner by a crank or gear wheel upon the axis of each, or otherwise, it being only necessary that they revolve independently. When these rollers are revolved they act to draw the pipe along the core $e$, as the metal is expelled by the plunger. These rollers may be hollow, with an opening at the axis for the admission of water to cool the rollers.

When both rollers are revolved in opposite directions, a straight pipe issues from between them. If the roller $b$ is stopped the pipe will be bent around the roller $b$. Then, if the roller $c$ be stopped and $b$ revolved, the trap will be bent back around $c$. An adjustable and movable bending-roller or concave shield may be applied contiguous to the roller $b$ or $c$ to aid in bending the pipe to form the half or quarter circle bends required in S and P traps, and in all cases the interior surfaces of the traps are smooth. In case the fountain is used above the bending-rollers, a valve should be applied around the core $e$ to regulate the flow of metal.

The fountain may be supplied with melted metal from a melting-pot, poured into the cylinder through an opening that is afterward closed, and heat should be used around the fountain to keep the metal in the proper semi-fluid condition.

A screw-plug can be applied to these traps, after they are made, by spreading the metal around an opening at the bottom of the bend and "sweating" on a screw-collar. By having the rollers adjustable sidewise, the traps can be made thicker at the bends than in their straight portions. These traps may be made of any desired lengths between the bends, so as to suit various locations.

By this apparatus the traps can be made successively, and cut off as fast as completed. If sufficient power is used to force out the pipe, without the assistance of revolving rollers, the bends may be made around stationary surfaces corresponding to the surfaces of the rollers, the pipe passing between the same and a concave-grooved die, so as to give the bend to the pipe as it issues from the die.

I claim as my invention—

The fountain and its core and die in combination with the pair of semicircular-grooved rollers for casting and simultaneously bending lead traps, substantially as set forth.

Signed by me this 5th day of August, A. D. 1875.

THOS. F. STEVENSON.

Witnesses:
  CHAS. H. SMITH,
  HAROLD SERRELL.